Oct. 22, 1968
T. M. ARNOLD
3,406,901
CALCULATING DEVICE
Filed June 5, 1967
2 Sheets-Sheet 1
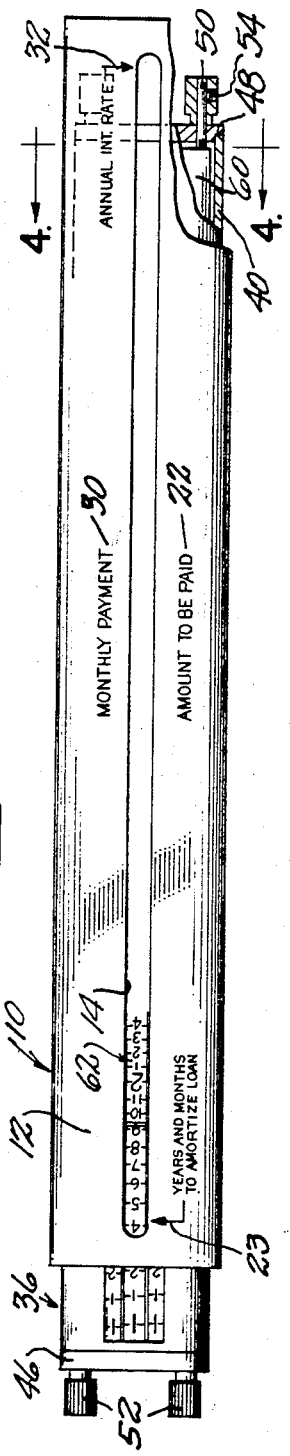
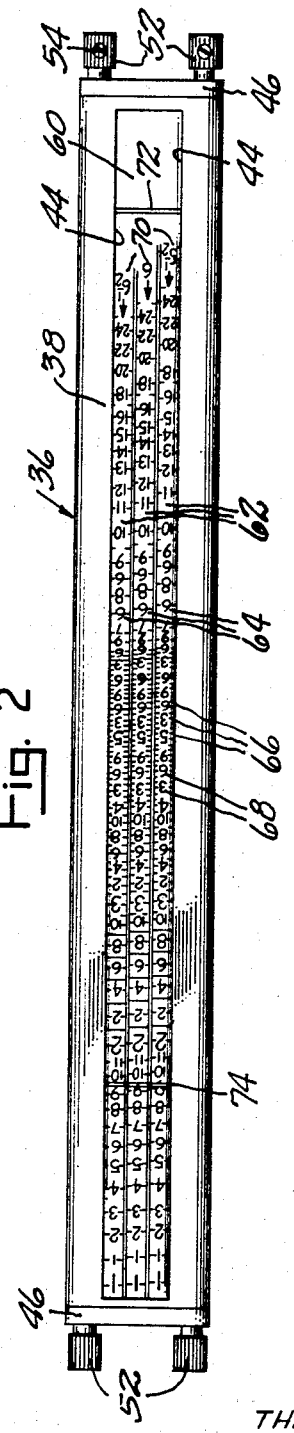
INVENTOR.
THEODORE M. ARNOLD
BY
ATTORNEY Oct. 22, 1968
T. M. ARNOLD
3,406,901
CALCULATING DEVICE
Filed June 5, 1967
2 Sheets-Sheet 2
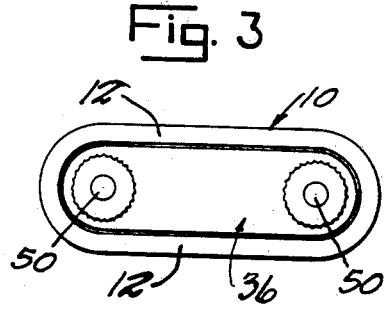
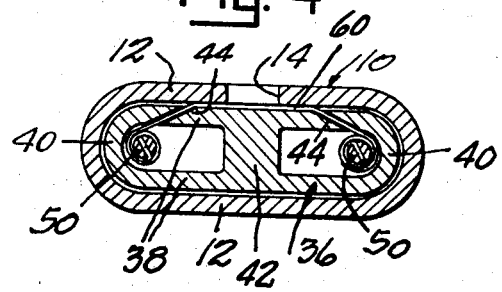
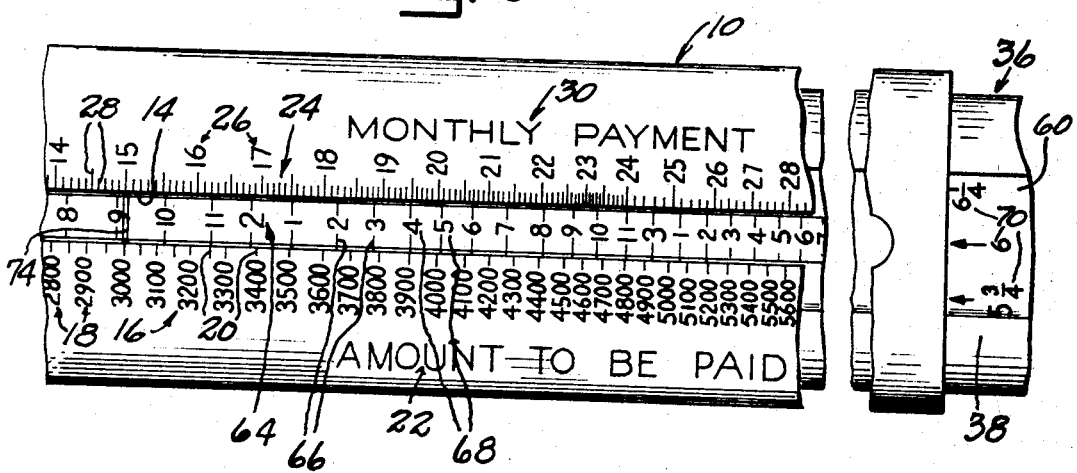
INVENTOR.
THEODORE M. ARNOLD
BY
*ATTORNEY*

United States Patent Office 3,406,901
Patented Oct. 22, 1968

3,406,901
CALCULATING DEVICE
Theodore M. Arnold, 25770 Shiawassee Road,
Southfield, Mich. 48075
Filed June 5, 1967, Ser. No. 643,512
7 Claims. (Cl. 235—86)

ABSTRACT OF THE DISCLOSURE

A calculating device having an outer open ended tubular member with a longitudinal sight opening bordered by graduated logarithmic scales, and an inner member slidable endwise in said outer member and carrying means adjustably mounting a web having a plurality of graduated logarithmic scales each selectively positionable between said inner and outer members and in register with and in selected longitudinal relation to said sight opening.

This invention relates to improvements in calculating devices and particularly to a device for making different types of calculations involving the payment of interest upon money at various rates and for various periods of time. The device is of the type in which various scales are brought into juxtaposition for making calculations and does not require the use of a cursor, as is commonly required in slide rules. The device is an improvement upon the device shown in my Patent No. 3,298,604, dated Jan. 17, 1967.

In my prior patented device, a cylindrical outer tubular member slidably and rotatably received a cylindrical inner member having a plurality of longitudinal logarithm scales thereon adapted to be selectively juxtaposed to correlated logarithm scales extending longitudinally of and at opposite sides of a slot in the outer member, said inner member also having circumferential index lines spaced a distance equal to a logarithmic cycle of one of the scales of the tubular member. The accurate manufacture of a device of this character is difficult and expensive because of the need to maintain accurate relationship of the various scales upon the inner member to one another, as well as to insure accuracy of the indicia of the individual inner scales. Accordingly, it is the primary object of this invention to provide a construction which utilizes the principle of the calculating device of my prior Patent No. 3,298,604 and achieves the advantages thereof, but which can be manufactured inexpensively and with assured accuracy for the intended calculations.

A further object is to provide a device of this character having an open ended tubular outer member provided with a slot or sight opening along the sides of which are arranged indicia in logarithmic scales which can be selectively juxtaposed to a selected one of the group of correlated logarithmic scales on a web adjustably positioned and carried by an inner slide member which can be shifted lengthwise in the outer member, said inner member carrying at its opposite ends means for adjusting the position of the web whereby at least one of the adjusting means will be exposed and adapted for manual manipulation in each setting of the device.

Other objects will be apparent from the following specification.

In the drawings:

FIG. 1 is a side view of the device with parts broken away.

FIG. 2 is a side view of the inner part of the device.

FIG. 3 is an end view of the device.

FIG. 4 is a transverse sectional view taken on line 4—4 of FIG. 1.

FIG. 5 is an enlarged fragmentary side view of the device showing the arrangement of the parts as used in making one type of calculation.

Referring to the drawings which illustrate one embodiment of the invention, the numeral 10 designates a rigid, elongated, tubular member open at both ends. The tubular member 10 may be formed of metal, plastic, paper or other suitable material and is preferably of flattened character having opposed substantially flat walls 12. Tubular member 10 is provided with sight opening or window 14 extending lengthwise thereof for the major portion of its length, preferably centered in one of the flat walls 12, and terminates substantially equally spaced from and adjacent to the opposite ends of the tube 10.

A linear group of indicia or scale 16 consisting of numerals 18 and short indicator lines 20 juxtaposed to the numerals and extending to one edge of the sight opening and perpendicular to the sight opening, extends lengthwise along one side of the sight opening substantially fulllength thereof. In one embodiment of the invention the numerals 18 may range from "1,000" to "20,000." The numerals 18 and indicator lines 20 are preferably so arranged as to constitute a graduated logarithmic scale of a selected type, such as a scale of amounts to be paid, and the scale is preferably so designated by indicia 22. At one end of the tube 10, preferably beyond or outwardly of the lower end of the scale 16 may appear the words "years and months to amortize loan," which words have associated therewith an arrow or indicator 23 pointing to the slot or sight opening 14 at a selected point along the length thereof.

A second linear group or scale of indicia 24 extends longitudinally on the tubular member 10 at the side of the sight opening 14 opposite that which bears the scale 16. The scale 24 consists of numerals 26 and indicator lines 28 correlated to the numerals and extending to the sight opening and perpendicular thereto. The numerals 22 preferably extend from "5" to "100" and are spaced apart greatest at the lower end of the scale, with the spacing between them progressively decreasing toward the opposite end of the scale, whereby the scale is a graduated logarithmic scale.

The lower ends of both scales 16 and 24 are adjacent to the same end of the tube 10 and the high ends of both scales are located adjacent the opposite end of the tube. Both scales are preferably of a length slightly shorter than the slot 14 and terminate inwardly from the ends of the slot. A suitable identifying legend 30 may appear alongside the scale 24, such as the words "monthly payments." Also, there may appear alongside scale 24 adjacent to one end thereof identifying indicia such as the words "annual interest rate" with an arrow 32 pointing to the sight opening 14 at a predetermined point thereof preferably at the end opposite that at which the legend and arrow 23 appear.

An inner member 36 has a snug sliding fit within the tube 10 and is of a length greater than the length of the sight opening 14 and approximately equal to the length of the member 10. Member 36 has an external cross sectional configuration fitting snugly in and preferably at least partly conforming to the internal configuration of the member 10 so as to avoid rotation therein, and as here shown constitutes a flattened tube open at both ends and having a pair of substantially parallel spaced side walls 38 interconnected by side portions 40 and by a longitudinal central web or wall 42 and defining spaced longitudinal chambers or cavities. One of the side walls 38 has a pair of longitudinal openings or slots 44 formed therein with the mouths thereof at the outer surface of said wall spaced apart a distance greater than the width of the sight opening 14. The slots 44 may terminate spaced from the opposite ends of the wall 38 or may extend full length of member 36.

An end member 46 spans each end of the inner member 36 and is preferably releasably anchored thereto, for which purpose it may be provided with a stepped margin having an inner shoulder 48 at the perimeter thereof fitting snugly within the member 36 while the outermost portion of said end member extends substantially flush with the outer surface of member 36. Each end member 46 has a pair of spaced openings therethrough, each of which is preferably substantially centered relative to one of the longitudinal cavities of inner member 36 and each journaling one end of a rod or shaft 50 extending lengthwise through member 36 and projecting from both ends thereof. Each rod or shaft 50 is preferably slotted longitudinally and each mounts at its ends knobs 52 which preferably are detachably anchored, as by set screws 54. The knobs are so arranged and are of such size that they are inset from a projection of the outer longitudinal surfaces of the inner member 36, as best seen in FIG. 3, and thereby freely accommodate endwise sliding of inner member 36 relative to the outer member 10, as to the position illustrated in FIG. 1.

A web, film or sheet 60 of paper or plastic having the properties of flexibility and substantial dimensional stability and of a length greater than the length of a sight opening 14 and preferably slightly less than the spacing between the inner faces of the end members 46 has its opposite longitudinal margins anchored to the opposite rods or shafts 50, as by anchorage thereof within slots in such rods. The width of the web 60 is substantially greater than the spacing between the rods 50, and the opposite side margins of the web are coiled or rolled around shafts 50. The portion of web 60 between the shafts 50 passes through the slots 44 so that a part of the web extends exteriorly of the inner member 36 so as to be positioned beneath and in register with the sight opening 14. In order to facilitate insertion and assembly of the web in the inner member 36 in this position, the slots 44 may be open at one end or at both ends of the inner member, so that web 60 may be preassembled on the shafts 50, and the assembly may then be moved into place endwise of the inner member 36 by sliding the web through slots 44 until the web reaches a longitudinal centered position in the inner member. This assembly is preferably done while knobs 52 at the leading ends of the shafts and end member 46 at the end toward which the preassembly is urged are removed or free. The end member and the knobs at the trailing end may be a part of the assembly. Consequently, when the assembly reaches proper position, assembly operation may be completed by sliding end member 46 upon the leading ends of the shafts, followed by anchoring of the knobs 52 upon the leading ends of the shafts.

Web 60 has a plurality of longitudinal scales 62 thereon arranged side by side, as illustrated in FIG. 2. Scales 62 are of different lengths, each correlating time with a selected rate of interest, and sometimes are referred to as "time scales." As illustrated in FIG. 2, each scale 62 contains numerals 64 indicating years and transverse lines or indicia 66 correlated to the numerals 64 and indicating subdivisions of years. The time scales may also include smaller numerals 68 arranged between numerals 64 and indicating months. In the preferred form, each longitudinal scale 62 extends from "1" to "25," and the numerals "1" of all scales 62 are arranged substantially side by side at one end of the web. The spacing between year-indicating numerals 64 progressively decrease lengthwise of each scale from the lower end to the higher end of the scale. Juxtaposed to each time scale 62, as at the high end thereof, is a numeral 70 indicating the rate of interest with which the aligned scale 62 is correlated. It will be observed that the lengths of the scales 62 vary, with those of lowest interest being of greatest length. The width of each individual time scale 62 is preferably substantially equal to the width of sight opening 14 so that, when the web is properly oriented for use, only one csale 62 will be visible through the sight opening, as seen in FIG. 1. The spacing and arrangement of indicia lines and numerals on each of the scales 62 is logarithmic, as commonly used in slide rules, and the scales 62 are correlated with the scales 16 and 24 as required for their conjoint use in making calculations.

A transverse line 72 extends across the web 60 and across the various scales 62 thereof spaced from one end of the web and is identified as the "par index line." A second transverse line 74 is located on the web adjacent the opposite end thereof and is referred to herein for purposes of convenience as the "decimal index line." The lines 72 and 74 are spaced one logarithmic cycle on scale 24.

In the use of the device, the position of the web 60 relative to the sight opening 14 is adjusted by rotating one of the knobs 54 to expose at the sight opening the indicia scale 62 correlated with the rate of interest involved in the problem being considered. The inner member 36 is then slid lengthwise in the outer member 10 until registry occurs between selected parts on the exposed scale 62 and a selected item upon one of the scales 16 or 24, or until registry is secured between a selected one of the transverse index lines 72 and 74 and a selected indicia upon one of the scales 16 and 24. Thereupon readings may be taken between the other of the scales 16 and 24 and a part upon the scale 62 which constitutes another given element of the problem to be solved. The various manners in which calculations can be made are fully explained in my prior Patent No. 3,298,604 and are performed similarly with the present device and therefore will not be further elaborated.

In order that the position of the web may be maintained as set during the time that the device is being manipulated, the shafts 50, while rotatable, are restrained from free rotation in any manner found suitable. Thus, springs or resilient elements restraining free rotation of the shafts may be employed in a manner not shown, but obvious to workers skilled in the art; as for example, by journaling each shaft in a constricting rubber grommet in one or both end members 46.

I claim:

1. A calculating device for solving problems involving the elements of time, rate of interest, amounts of periodic payments and principal amount, comprising an outer open ended tubular member having a longitudinal sight opening for the major portion of its length and a pair of graduated logarithmic scales alongside said sight opening and each designating a selected range of one of said problem elements, said tubular member having a noncircular cross-sectional shape, an inner member fitting snugly and slidable endwise in said tubular member, a web having a plurality of graduated logarithmic scales arranged side by side and correlated with said first named scales, and means adjustably mounting said web on said slidable inner member to register a selected scale of said web with said sight opening, said last named means including a rotatable part of greater length than said outer tubular member and projecting from at least one end of said inner member and receivable with clearance in said outer member.

2. A calculating device as defined in claim 1, wherein said slidable inner member is chambered and said mounting means positions portions of said web therein, said inner member having slots through which said web extends to expose a selected web portion between said outer and inner members at said sight opening.

3. A calculating device as defined in claim 1, wherein the portion of said outer member in which said sight opening is formed is substantially flat and said inner member has a substantially flat cooperating portion defining a clearance space receiving and positioning portions of said web at opposite sides of the scale-bearing web portion which registers with said sight opening.

4. A calculating device as defined in claim 1, wherein said outer tubular member has a pair of substantially flat portions in one of which said sight opening is formed.

5. A calculating device as defined in claim 1, wherein said inner member has a pair of longitudinal cavities therein separated by a wall and each having a web-receiving passage, said web-mounting means having part thereof positioned in each cavity, said web extending externally of said inner member between said passages.

6. A calculating device as defined in claim 1, wherein said inner member is chambered and includes end walls each having spaced apertures, said web-mounting means including spaced shafts journaled in aligned end wall apertures and each anchoring one marginal portion of a web, said inner member having spaced web-receiving passages between which a portion of said web is positioned for visibility through said sight opening.

7. A calculating device as defined in claim 1, wherein said inner member is chambered and has web passages therein located at opposite sides of said sight opening, said web-mounting means comprising spaced rotatable shafts each carrying a margin of a web and having hand grip portions at opposite ends projecting from said inner member and within the outline of the cross-sectional shape of said inner member.

References Cited

UNITED STATES PATENTS

| | | | |
|---|---|---|---|
| 1,088,889 | 3/1914 | Falvey et al. | 235—86 |
| 1,209,474 | 12/1916 | Milner | 235—86 |
| 1,413,021 | 4/1922 | Gibb | 235—86 |
| 1,415,297 | 5/1922 | Belt | 235—86 |
| 1,472,276 | 10/1923 | Meyer | 235—86 |
| 1,481,590 | 1/1924 | Coughlin | 235—86 |
| 2,204,911 | 6/1940 | Richter | 235—86 |
| 3,266,723 | 8/1966 | Routen | 235—86 |
| 3,298,604 | 1/1967 | Arnold | 235—87 |

RICHARD B. WILKINSON, *Primary Examiner.*

S. A. WAL, *Assistant Examiner.*